United States Patent [19]
deCler et al.

[11] Patent Number: 5,975,489
[45] Date of Patent: Nov. 2, 1999

[54] VALVE AND METHOD FOR ASSEMBLING THE SAME

[75] Inventors: C. Peter deCler, St. Paul; David W. Meyer, Jordan; Blaine C. Sturm, Anoka, all of Minn.

[73] Assignee: Colder Products Company, St. Paul, Minn.

[21] Appl. No.: 08/631,757

[22] Filed: Apr. 12, 1996

[51] Int. Cl.[6] .................................................. F16L 37/28
[52] U.S. Cl. .......................... 251/149.1; 251/904; 285/317
[58] Field of Search ................................ 251/149.6, 904, 251/149.1; 137/614.03, 614.04, 614.05; 285/305, 317, 921

[56] References Cited

U.S. PATENT DOCUMENTS

| | | |
|---|---|---|
| 3,450,424 | 6/1969 | Calisher et al. . |
| 3,994,317 | 11/1976 | Miyazaki et al. .................. 137/614.03 |
| 4,137,930 | 2/1979 | Scholle . |
| 4,447,040 | 5/1984 | Magorien . |
| 4,613,112 | 9/1986 | Philipot et al. ..................... 285/317 X |
| 4,679,618 | 7/1987 | Farkas . |
| 4,880,029 | 11/1989 | Koller . |
| 4,892,117 | 1/1990 | Spalink et al. ..................... 137/614.03 |
| 4,903,942 | 2/1990 | Licciardello et al. ............... 251/149.1 |
| 4,946,455 | 8/1990 | Rosen . |
| 5,072,756 | 12/1991 | Carr . |
| 5,090,747 | 2/1992 | Kotake ................. 285/317 X |
| 5,104,158 | 4/1992 | Meyer et al. ........................ 285/317 X |
| 5,215,122 | 6/1993 | Rogers et al. . |
| 5,255,713 | 10/1993 | Scholle et al. . |
| 5,316,041 | 5/1994 | Ramacier, Jr. et al. ............. 285/317 X |
| 5,381,836 | 1/1995 | Braatz et al. .................. 137/614.04 X |
| 5,406,980 | 4/1995 | Allread et al. . |
| 5,452,736 | 9/1995 | Arosio ............................ 137/614.03 X |
| 5,555,908 | 9/1996 | Edwards et al. ................. 251/149.6 X |

FOREIGN PATENT DOCUMENTS

| | | | |
|---|---|---|---|
| 1298378 | 6/1969 | Germany ............................... 285/317 |
| 2140132 | 11/1984 | United Kingdom . |

OTHER PUBLICATIONS

A copy of the International Search Report for counterpart PCT Application No. PCT/US97/05892.

Primary Examiner—Kevin Lee
Attorney, Agent, or Firm—Merchant, Gould, Smith, Edell, Welter & Schmidt

[57] ABSTRACT

A valve for dispensing fluid to and from a container. The valve includes a housing defining a flow passage extending longitudinally therethrough. A poppet member is telescopically mounted in the flow passage of the housing and is telescopically movable between an open position and a closed position. The poppet member has a proximal end portion that includes a second retaining structure that cooperates with a first retaining structure of the housing to provide a snap fit connection for retaining the poppet member in the housing. The snap fit connection allows the poppet member to be mounted in the housing by inserting the poppet member through a front end of the housing member.

30 Claims, 5 Drawing Sheets

VALVE AND METHOD FOR ASSEMBLING THE SAME

FIELD OF THE INVENTION

The present invention relates generally to coupling structures for dispensing fluids. More particularly, the present invention relates to valve assemblies for dispensing fluid to or from a container.

BACKGROUND OF THE INVENTION

Disposable containers are routinely used in commercial and industrial applications to transport and dispense a variety of fluids such as food products, cleaning solutions, detergents, and other products. Some containers are constructed of semi-rigid plastic while others are constructed of flexible plastic and are often supported within a protective box.

It is common for such containers to be equipped with valve structures that facilitate dispensing fluids to or from the containers. The valve structures are preferably designed to be quickly coupling with exterior coupling members. Additionally, because the valves are typically disposable, cost is an important factor that must be considered in designing the valves.

Known valves typically include outer closures or housings that define longitudinal flow paths extending therethrough. Poppet members are generally telescopically mounted within the housings and are telescopically moveable between open and closed positions. Conventional poppet members typically include face seals for forming a seal with the housing. The poppet members are typically mounted in the housings by inserting the poppet members through the back sides of the housings and then using separate retaining members or collars to retain the poppet members within the housings. Consequently, a conventional valve typically has at least three separate parts which include the housing, the poppet member, and the retaining collar.

What is needed is a more cost effective valve. What is also needed is a valve having a minimal number of parts. Furthermore, what is needed is a valve that can be assembled rapidly. Moreover, what is needed is a valve assembly method that is conducive for automation.

SUMMARY OF THE INVENTION

The present invention relates to a valve for dispensing fluid to and from a container. The valve includes a housing defining a flow passage extending longitudinally therethrough. A poppet member is telescopically mounted in the flow passage of the housing and is telescopically movable between an open position and a closed position. The poppet member has a proximal end portion that includes a second retaining structure that cooperates with a first retaining structure of the housing to provide a snap fit connection for retaining the poppet member in the housing. The first retaining structure is preferably integrally or unitarily formed as a single piece with the housing. Similarly, the second retaining structure is preferably integrally or unitarily formed as a single piece with the poppet member.

The snap fit connection provides the advantage of allowing the poppet member to be mounted in the housing by inserting the poppet member through a front end of the housing member and snapping the poppet member into place. Such a simple assembly process is ideally suited for automation. Consequently, the cost of manufacturing the valve can be minimized.

The snap fit connection also provides the advantage of minimizing the total number of parts required to retain the poppet member within the housing. No separate retaining collar is required to hold the poppet within the housing. Instead, all of the structure necessary to retain the poppet member within the housing is incorporated as part of the housing or the poppet member.

Another aspect of the present invention relates to a method for assembling the above-described valve. The method includes the step of inserting the proximal end of the poppet member into the front end of the housing. Next, the poppet member is pushed toward the back end of the housing thereby causing the second retaining structure on the proximal end portion of the poppet member to snap past the first retaining structure of the housing. Once the second retaining structure is snapped past the first retaining structure, interference between the first and second retaining structures prevents the poppet member from disengaging from the housing.

The present invention also relates to a coupling assembly that incorporates the above-described valve. The coupling assembly includes a female coupling structure suitable for connection to the front end of the valve. The coupling structure defines a flow passage extending longitudinally therethrough and also defines a slot oriented generally transversely with respect to the coupling structure. A clip member is mounted in the slot and is movable between first and second positions. In the first position, the clip member is adapted for retaining the valve within the coupling member. In the second position, the clip member is adapted for receiving the front end of the valve into the coupling structure or for releasing the valve from the coupling structure. A sealing member for forming a fluid tight seal between the coupling structure and the valve is mounted within the flow passage of the coupling structure. The sealing member is retained within the coupling structure by the clip member.

It will be appreciated that the valve is typically disposable with the container. In contrast, the female coupling member is not typically a disposable item. Consequently, by mounting the sealing member within the female coupling, the cost of the disposable portion of the coupling assembly is minimized. Furthermore, the use of a clip to retain the sealing member within the female coupling eliminates the need for any grooves or undercuts to be formed in the female coupling structure or in the valve for retaining the sealing member. As a result, portions of the valve and female coupling structure can be manufactured by a seamless or part-line-free molding process.

A variety of additional advantages of the invention will be set forth in part in the description which follows, and in part will be obvious from the description, or may be learned by practice of the invention. The advantages of the invention will be realized and attained by means of the elements and combinations particularly pointed out in the claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. A brief description of the drawings is as follows.

DETAILED DESCRIPTION OF THE INVENTION

Reference will now be made in detail to exemplary embodiments of the present invention which are illustrated in the accompanying drawings. Wherever possible, the same reference numbers will be used throughout the drawings to refer to the same or like parts.

Figure 1:
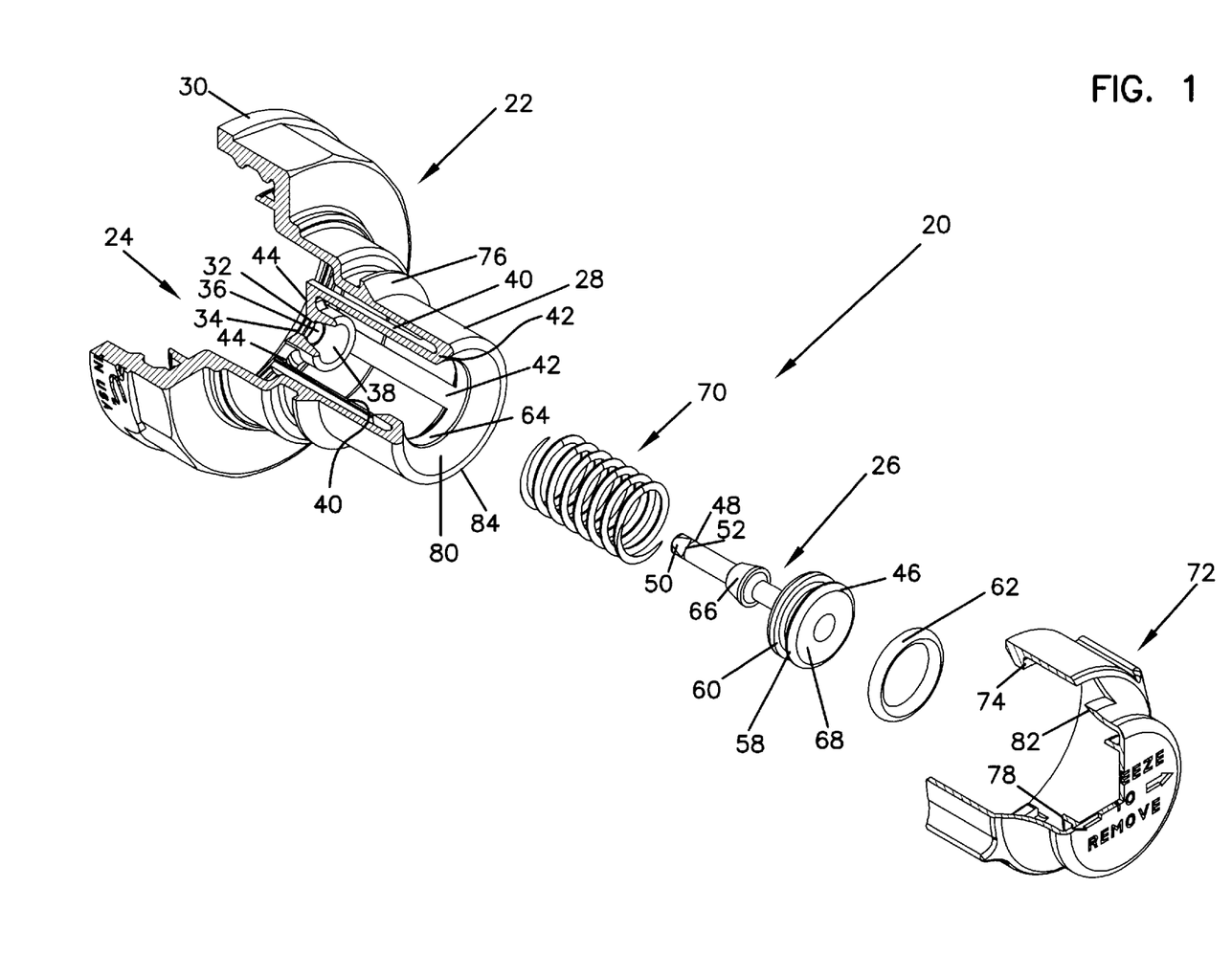
FIG. 1 shows an exploded perspective view of a valve constructed in accordance with the principles of the present invention, the valve housing and valve cap are partially cut away to show the inner components of the valve.
Figure 2:
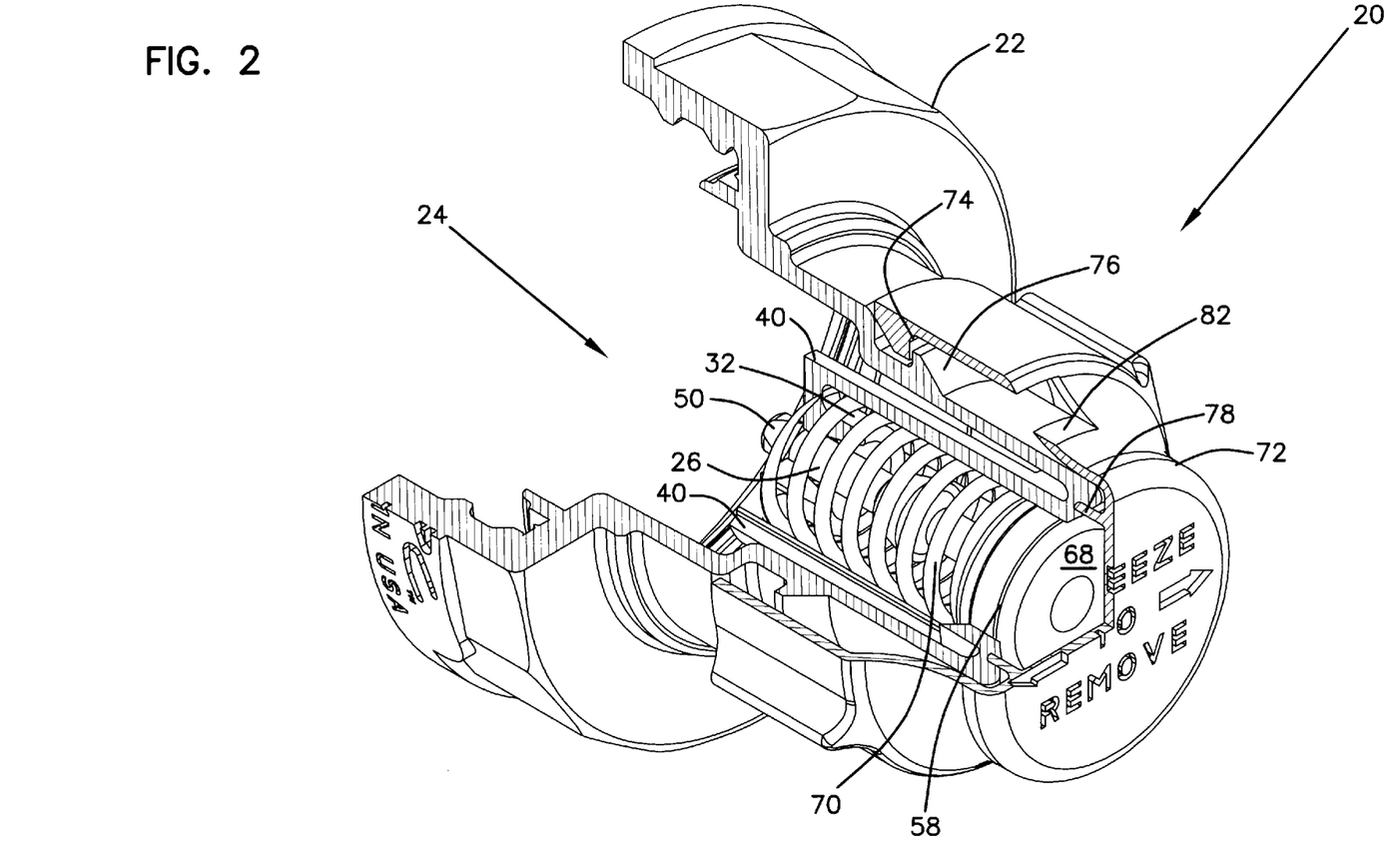
FIG. 2 shows an assembled perspective view of the valve illustrated in FIG. 1, the valve housing and valve cap are partially cut away to show the inner components of the valve.
Figure 5:
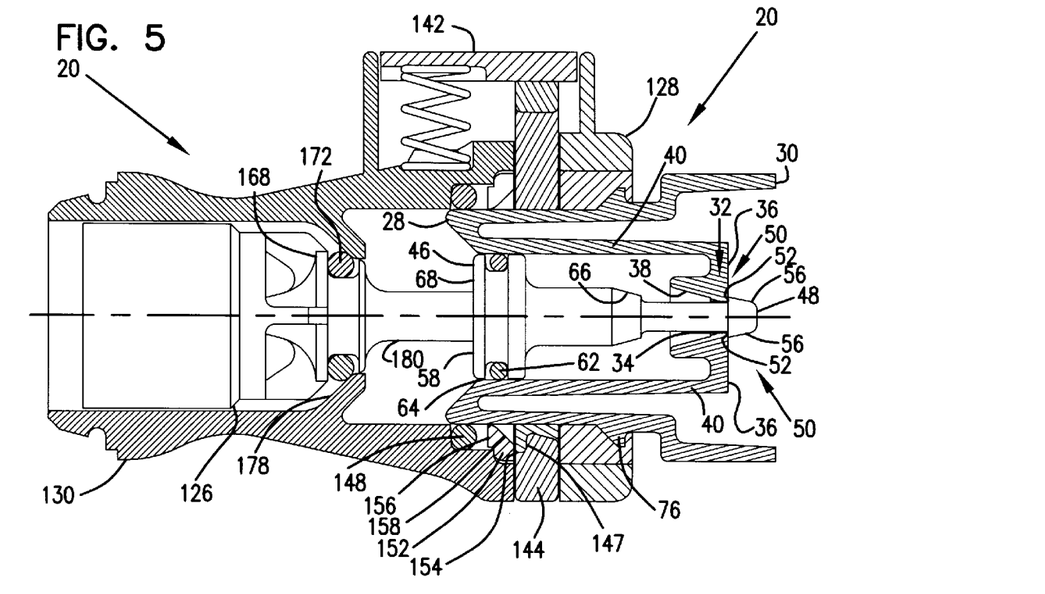
FIG. 5 shows a schematic cross sectional view illustrating the valve of FIGS. 1 and 2 and the female coupling assembly of FIGS. 3 and 4 prior to connection.
Figure 6:
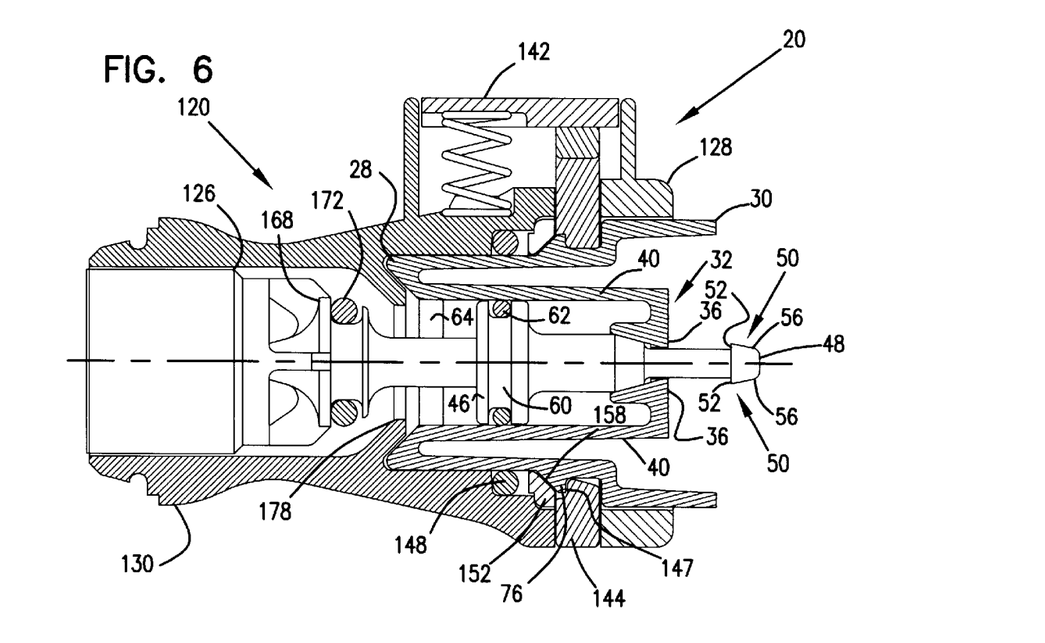
FIG. 6 shows a schematic cross sectional view of the valve of FIGS. 1 and 2 and the female coupling assembly of FIGS. 3 and 4 being coupled together.

FIGS. 1 and 2 illustrate a valve 20 constructed in accordance with the principles of the present invention. The valve 20 includes a housing 22 defining a flow passage 24 extending longitudinally therethrough. A poppet member 26 is telescopically mounted in the flow passage 24 of the housing 26 and is telescopically movable between an open position (as shown in FIG. 6) and a closed position (as shown in FIG. 5).

The housing 22 has a front end 28 positioned opposite from a back end 30. The front end 28 is shaped to form a male coupling portion suitable for connection to a female coupling. The back end 30 of the housing 22 is adapted for connection to a conventional fluid container. For example, the back end 30 is shown having a set of threads designed for threadingly engaging a threaded spout of a container. It will be appreciated that the back end 30 could have a variety of other configurations. For example, the back end 30 could provide a snap fit connection with a container or could be heat fused or adhesively bonded to a container.

The housing 22 also includes a first retaining structure for retaining the poppet member 26 within the flow passage 24. The first retaining structure is preferably, but not necessarily, integrally formed as a single piece unit with the housing 22. As shown in FIGS. 1 and 2, the first retaining structure comprises a mounting/containment ring 32 that is mounted within the flow passage 24 and is preferably constructed of a plastic material. The containment ring 32 includes a central aperture 34 that is centered generally along a central longitudinal axis of the housing 22. The containment ring 32 includes a back surface 36 that is aligned generally transversely with respect to the longitudinal axis of the housing 22 and a front surface 38 that defines a generally frustral conical shaped void.

It will be appreciated that the containment ring 32 can be mounted in the flow passage 24 of the housing 22 by a variety of mounting techniques. For example, FIGS. 1 and 2 show the containment ring 32 mounted in the flow passage 24 by a mounting cage. The mounting cage is designed to allow large flow volumes through the flow passage 24. The mounting cage includes a plurality of legs 40 that extend axially through the flow passage 24 in spaced relation from the inner radial surface of the housing 22. The legs 40 are spaced from the interior surface of the housing in order to prevent sink marks from appearing on the exterior of the housing 22 at the time the housing 22 is formed.

The legs 40 of the mounting cage include first ends 42 that are integrally formed with the front end 28 of the housing and second ends 44 that are integrally formed with the containment ring 32. It will be appreciated that in alternative embodiments, the legs could extend radially outward from the containment ring 32 and connect directly to the interior surface of the housing 22. Also, it is preferred for the mounting cage to have four legs 40 (only three are shown in FIGS. 1 and 2). However, it will be appreciated that the number of legs can be varied without departing from the scope of the present invention.

As previously described, the poppet member 26 of the valve 20 is telescopically mounted in the flow passage 24 of the housing 22. The poppet member 26 includes a distal end portion 46 that is positioned opposite from a proximal end portion 48. The proximal end portion 48 includes a second retaining structure that cooperates with the first retaining structure of the housing 22 to provide a snap fit connection for retaining the poppet member 26 in the housing 22. The second retaining member is preferably, but not necessarily, integrally formed as a single piece unit with the poppet member 26. As shown in FIGS. 1 and 2, the second retaining structure comprises a pair of projections such as barbs 50 (only one shown in FIGS. 1 and 2) that extend radially outward from opposite sides of the proximal end portion 48 of the poppet member 26. The barbs 50 cooperate with the containment ring 32 to retain the poppet member 26 in the housing 22.

As best shown in FIGS. 5 and 6, the barbs 50 have outer edges 56 that taper radially outward from the proximal end 48 of the poppet member 26. The barbs 50 also define retaining surfaces 52 or shoulders that are generally transverse with respect to a longitudinal axis of the poppet member 26 and are adapted to engage the back surface 36 of the containment ring 32 to retain the poppet member 26 within the housing. At least portions of the barbs 50 define a width that is larger than the diameter of the central aperture 34 of the containment ring 32. The barbs 50 are preferably made of an elastic/resilient material such as polyethylene or polypropylene.

The distal end portion 46 of the poppet member 26 includes an enlarged disk-shaped head member 58 having an outer radial surface defining a circumferential groove 60 that surrounds the head member 58. A resilient annular sealing member 62 such as an O-ring is mounted within the circumferential groove 60. When the poppet member 26 is in the closed position, the sealing member 62 provides a fluid tight seal between the outer radial surface of the enlarged head member 58 and an interior radial sealing surface 64 of the housing 22.

Unlike conventional face seals, the outer radial sealing structure of the poppet member 26 allows the poppet member 26 to be inserted through the front end 28 of the housing 22. Furthermore, the sealing member 62 maintains a sealing engagement with the interior radial sealing surface 64 of the housing 22 even if the enlarged head member 58 is moved slightly with respect to the sealing surface 64 thereby helping to prevent inadvertent leaks.

The enlarge head member 58 is also equipped with a substantially flat outer face 68. When the poppet member 26 is in the closed position, the flat outer face 68 is recessed from the front end of the housing 22 to prevent the valve 20 from being inadvertently opened.

The poppet member 26 further includes a stop member 66 positioned between the distal and proximal end portions 46 and 48 of the poppet member 26. The stop member 66 is generally frustral conical shaped and engages the front surface 38 of the containment ring 32 to limit the axial movement of the poppet member 26 within the housing 22.

The valve 20 also includes a spring member 70 mounted on the poppet member 26. One end of the spring member 70 extends over the containment ring 32 and engages the second ends 42 of the legs 40. The other end of the spring member 70 engages a back surface of the enlarged head member 58. In this manner, the spring member is captured within the flow passage 24 of the housing 22.

The spring member preferably exerts a spring force of five to ten pounds upon the poppet member 26 such that the poppet member 26 is biased toward the closed position. When the poppet member 26 is in the closed position, the spring member 70 exerts a force on the containment ring 32 that is opposed by a generally equal and opposite resultant force exerted on the containment ring 32 by the retaining surfaces 52 of the barbs 50. In this manner, the containment ring 32 is forced balanced. The substantial force balancing of the containment ring 32 minimizes tension on the legs 40 of the mounting cage while the poppet member 26 is in the closed position. By minimizing stress on the legs 40, potential deformation or stretching of the legs 40 can be minimized or prevented.

The valve 20 further includes an outer cap 72 that is typically mounted on the front end 28 of the housing 22 when the valve is not in use. The cap 72 is preferably constructed of a resilient plastic material such as polyurethane or polyethylene. The cap 72 includes opposing tabs 74 (only one shown) or undercut portions that engage an annular outer shoulder 76 of the housing 22 to retain the cap 72 between the tabs 74 on the front end of the housing 22. By squeezing opposing sides of the cap 72, the cap can be moved between a compressed orientation and a non-compressed orientation. In the compressed orientation, the width between the opposing tabs 74 is larger than the outer diameter of the outer shoulder 76 of the housing 22 such that the cap 72 can be inserted over the outer shoulder 76. In contrast, when the cap 72 is in the non-compressed orientation, the width between the opposing tabs 74 is smaller than the outer diameter of the outer shoulder 76. Consequently, by squeezing the cap 72, inserting the squeezed cap 72 over the outer shoulder 76, and releasing the cap 72 such that it returns to the non-compressed position, the cap 72 can be mounted on the front end 28 of the housing 22.

The cap 72 is equipped with a first sealing ring 78 or flange for providing a first seal with the front end 28 of the housing 22. When the cap 72 is mounted on the front end 28 of the housing, the first sealing ring 78 is compressed against a recessed radial portion 80 of the housing 22 to provide a seal. The recessed radial portion inclines axially inward from the front end 28 of the housing 22 toward the back end 30 of the housing.

The cap 72 is also equipped with a second sealing ring 82 or flange. When the cap 72 is mounted on the front end of the housing 22, the second sealing ring 82 engages an outer edge or lip 84 of the housing 22 to form a secondary seal.

The design of the valve 20 provides numerous advantages. One important advantage relates to the ease in which the valve 20 can be assembled. The valve 20 is assembled by placing the spring member 70 over the proximal end portion 48 of the poppet member 26. Alternatively, the spring 70 could be first placed in the housing 22 such that the proximal end portion 48 of the poppet member 26 can be subsequently inserted therethrough. The proximal end portion 48 of the poppet member 26 is then inserted into the flow passage 24 through the front end 28 of the housing 22. As the proximal end portion 48 is inserted into the housing 22, the barbs 50 are not required to be in any particular orientation. The poppet member 26 is then pushed toward the back end 30 of the housing thereby causing the barbs 50 to be compressed within the central aperture 34 of the containment ring 32 and/or the containment ring 32 to be expanded radially outward to allow passage of the barbs 50 through the containment ring 32. The poppet member 26 is continued to be pushed toward the back end 30 of the housing 22 until the barbs 50 snap past the back surface 36 of the containment ring 32. Once the poppet member 26 is snapped in place, interference between the retaining surfaces 52 of the barbs 50 and the back surface 36 of the containment ring 32 prevents the poppet member 26 from being completely withdrawn from the housing 22.

As assembled, the poppet member 26 is free to slide telescopically between the closed position shown in FIG. 5 and the open position shown in FIG. 6. The range of telescopic motion of the poppet member 26 with respect to the housing 22 is limited by the barbs 50 and also by the stop member 62.

After the poppet member 26 is snapped within the housing 22, the cap 72 is squeezed and inserted over the front end 28 of the housing 22. Once the cap 72 is positioned over the front end 28 of the housing 22, the cap is released such that the tabs 74 engage the outer shoulder 76 of the housing 22 to retain the cap 72 on the front end 28 of the housing 22.

It will be appreciated that the valve 20 is preferably constructed of a plastic material such as polypropylene or polyethylene and is also preferably formed by a conventional molding process. It is preferred for the valve 20 to be used in low pressure situations under 120 psi. It is more preferred for the valve 20 to be used in low pressure situations under 60 psi. It is most preferred for the valve to be used in low pressure situations under 10 psi.

It will also be appreciated that the configuration of the front end 28 of the housing 22 can be varied by conventionally known keying techniques such that the valve 20 can only be connected to a designated female coupling. One conventional keying technique is to vary the outer diameter of the front end 28 of the housing 22. It is desirable to key the valve in order to prevent the valve from being inadvertently connected to an inappropriate coupling. This is especially important if the valve is being used to dispense hazardous or non-biocompatible fluids.

It will further be appreciated that the present invention is not limited to the snap fit connection specifically shown in FIGS. 1 and 2. A variety of other configurations could be used to provide a snap fit connection between housing and a poppet member. For example, a poppet member could have a plurality of legs having radially extending tabs that engage a shoulder defined by the inner radial surface of the housing. This is but one example of an alternative snap fit connection that is included within the scope of the present invention. It will also be appreciated that the present invention is not limited to the barbs specifically shown in the present invention. For example, a variety of other projections, tabs, or shoulders having components transverse to a longitudinal axis of the poppet member could also be used.

Figure 3:
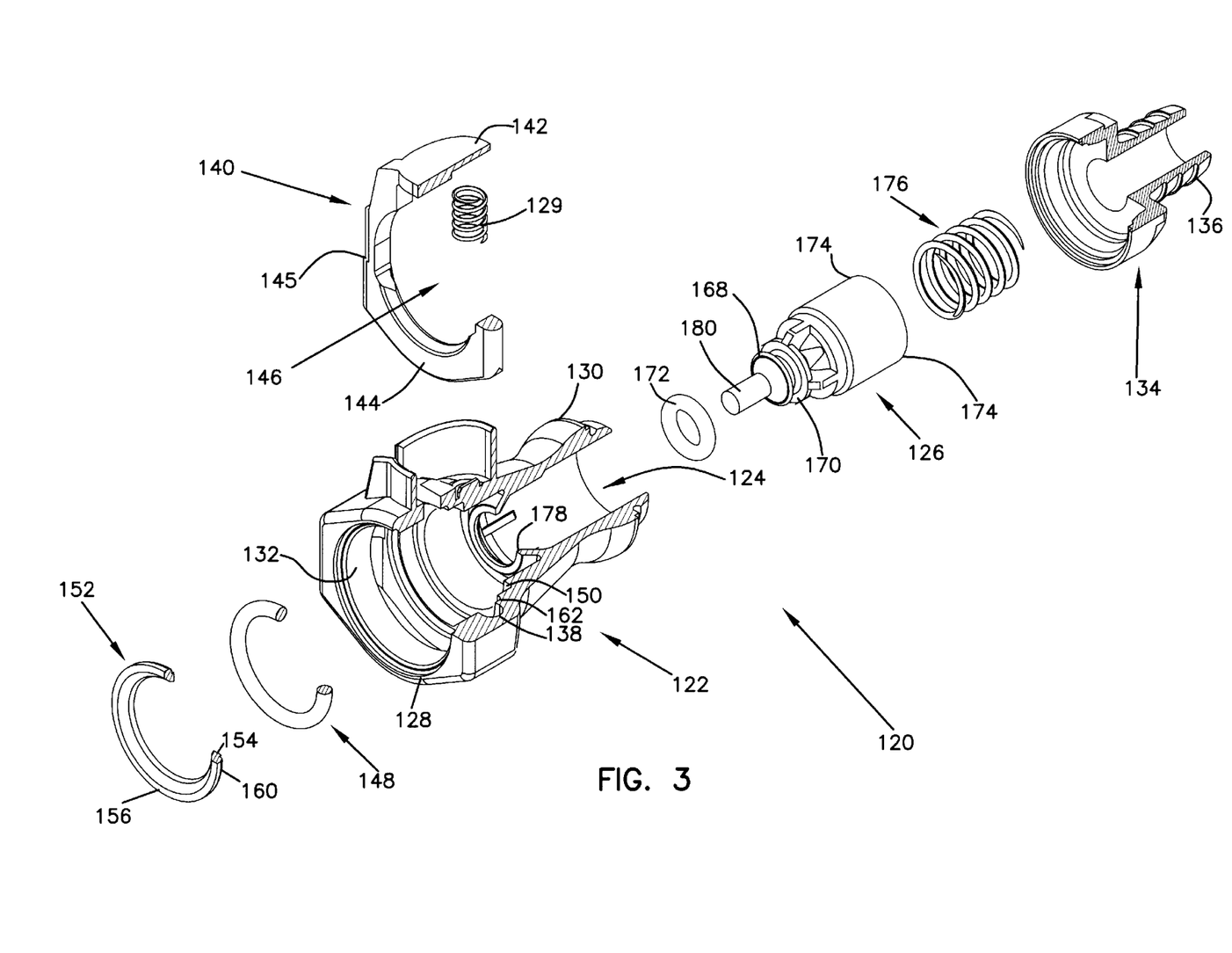
FIG. 3 shows an exploded perspective view of a female coupling structure suitable for connection to the valve of FIGS. 1 and 2, portions of the coupling assembly are cut away to better illustrate the inner components of the coupling assembly.
Figure 4:
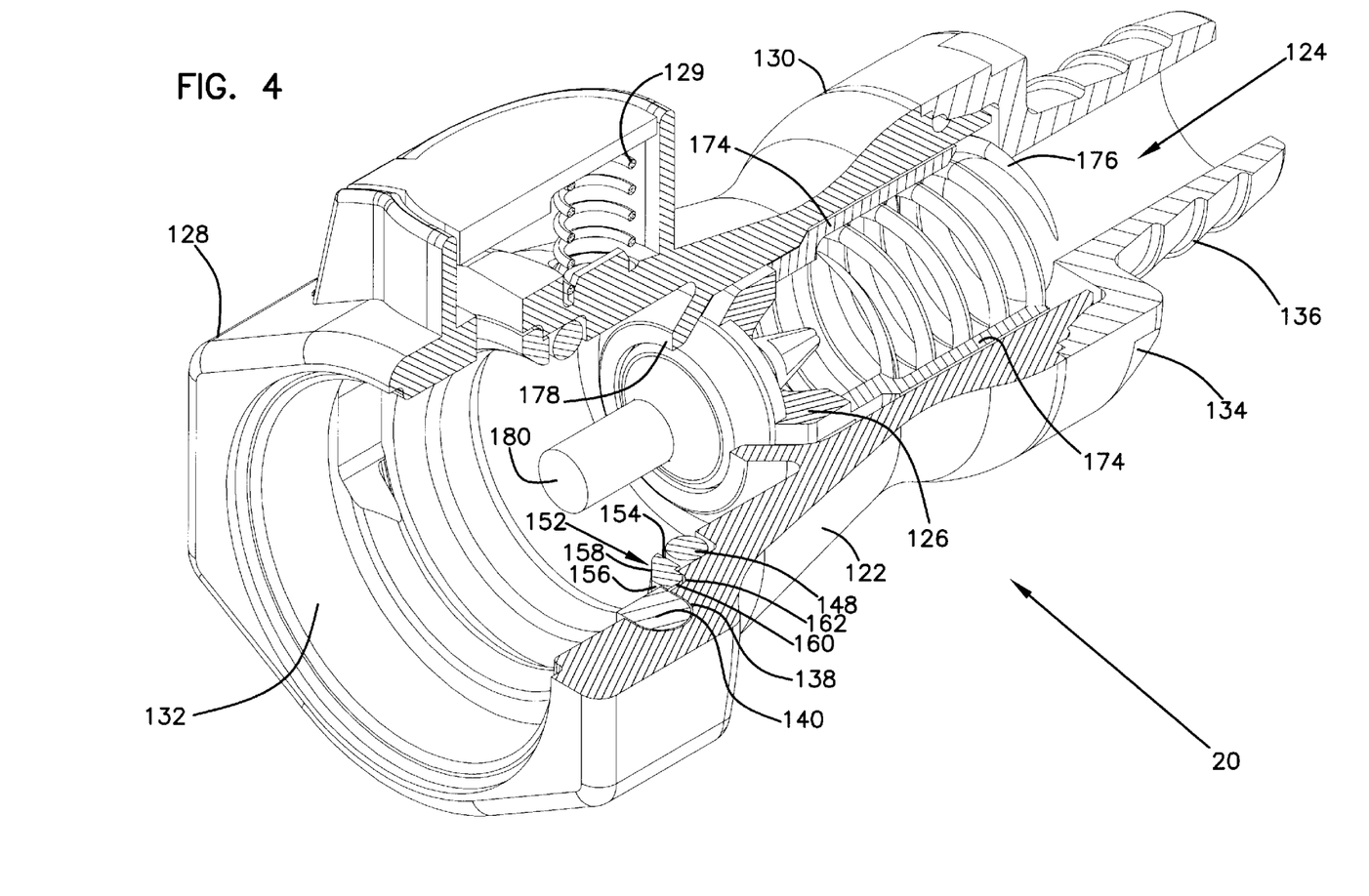
FIG. 4 shows an assembled perspective view of the female coupling structure shown in FIG. 3, portions of the coupling assembly are cut away to better illustrate the inner components of the coupling assembly.

FIGS. 3 and 4 illustrate a female coupling member 120 constructed in accordance with the principles of the present invention that is suitable for connection to the front end 28 of the valve 20. The female coupling member 120 includes a coupling housing 122 that defines a fluid passage 124 extending longitudinally therethrough. A sealing plunger 126 is telescopically mounted within the fluid passage 124 of the coupling housing 122. The sealing plunger 126 is telescopically movable between an open position (as shown in FIG. 6) and a closed position (as shown in FIG. 5).

The coupling housing 122 includes a first end 128 that is opposite from a second end 130. The first end 128 defines an opening 132 in fluid communication with the fluid passage 124 that is sized to receive the front end 28 of the valve 20. The second end 130 of the coupling housing 122 is enclosed by end cap 134 that includes a plurality of barbs 136 for connecting the second end 130 to a hose.

The coupling housing 122 also preferably defines a slot 138 located adjacent to the first end 128 of the housing 122. The slot 138 extends generally transversely through the housing 122 and is adapted to receive a clip member 140 therein. The clip member 140 is movable within the slot 138 between a retaining position and a connect/disconnect position. In the retaining position, a bottom portion of the clip member 140 projects into the flow passage 124 such that clip member 140 is adapted for retaining the front end 28 of the valve 20 within the female coupling member 120. In the connect/disconnect position, the bottom portion of the clip member 140 is recessed within the slot 138 such that sufficient clearance is provided to allow the front end 28 of the valve 20 to be inserted within or withdrawn from the female coupling structure 120. A spring 129 biases the clip member 140 toward the retaining position.

The clip member 140 includes a tab portion 142 that is interconnected with a plate portion 144. The tab portion 142 provides a surface for a user to press down on the clip member 140 so as to move the clip member transversely with respect to the coupling member 120 from the retaining position toward the connect/disconnect position.

The plate portion 144 of the clip member 140 defines an aperture 146 that is sufficiently large to allow the front end 28 of the valve 20 to extend therethrough and is generally alignable with the fluid passage 124 of the coupling housing 122. When the clip member 140 is moved to the connect/disconnect position, there is sufficient clearance for the front end 28 of the valve 20 to be inserted through the aperture 146 and into the fluid passage 124 of the coupling housing 122. When the clip member 140 is moved to the retaining position, a lip or shoulder 147 at the bottom of the plate portion 144 of the clip member 140 engages the outer shoulder 76 of the valve 20 to retain the valve 20 within the female coupling member 120 (as shown in FIG. 6). The plate portion 144 also preferably includes barbs 145 (one shown) that cooperate with shoulders (not shown) within the slot 138 to retain the clip 140 in within the slot 138. A more detailed description of a similar clip member is described in U.S. Pat. No. 5,052,725 that is hereby incorporated by reference.

An annular sealing member 148 such as a rubber or elastomeric O-ring is mounted within the fluid passage 124 of the coupling housing 122. The sealing member 148 is captured between a radial shoulder 150 defined by the coupling housing 122 and a retaining ring 152 mounted in the fluid passage 124 of the coupling housing 122. The retaining ring 152 is held within the coupling housing 122 by the plate portion 144 of the clip member 140 which overlaps the retaining ring 152 at predetermined locations.

The retaining ring 152 includes a first flat surface 154 that engages the sealing member 148 and an opposing second flat surface 156 that is overlapped by and engages the plate portion 144 of the clip member 140. The retaining ring 152 also includes an inclined inner radial surface 158 that is configured to engage the outer shoulder 76 of the valve 20 when the valve is inserted in the female coupling member 120. The retaining ring 152 further includes an outer radial shoulder 160 that mates with a second radial shoulder 162 defined by the coupling housing 122. A curved portion of the outer radial shoulder 160 fits within a corresponding curved portion defined by the coupling housing 122.

As previously described, the sealing plunger 126 of the female coupling member 120 is telescopically mounted in the fluid passage 124. The sealing plunger 126 includes a head portion 168 defining a circumferential groove 170 and including an axial projection member 180. An O-ring 172 is mounted in the circumferential groove 170. The sealing plunger 126 also includes a plurality of legs 174 that surround a spring member 176. The spring member 176 is captured between the end cap 134 and the sealing plunger 126 and functions to bias a sealing plunger 126 toward the closed position as shown in FIG. 5. When in the closed position, the O-ring 172 engages a sealing ring 178 that is integrally formed with the inner radial surface of the coupling housing 122. In this manner, the O-ring 172 provides a fluid tight seal.

The female coupling member 120 is assembled by first inserting the sealing member 148 in the first end 128 of the coupling housing 122. Next, the retaining ring 152 is inserted into the first end 128 of the coupling housing 122 so as to engage the sealing member 148. The clip member 140 is then snapped within the slot 138 such that the sealing member 148 and the retaining ring 152 are captured within the coupling housing 122. The sealing plunger 126 and the spring 176 are then inserted into the fluid passage 124 through the second end 130 of the coupling housing 122. The sealing plunger 126 and the spring 176 are held within the fluid passage 124 by the end cap 134 that is preferably snapped, screwed or bonded to the second end 130 of the coupling housing 122.

FIGS. 5 and 6 show a coupling assembly incorporating the valve 20 and the female coupling structure 120. FIG. 5 shows the valve 20 and the female coupling member 120 before being coupled together. The female coupling member 120 is connected to the valve 20 by inserting the first end 128 of the coupling member 120 over the front end 128 of the valve 20. As the coupling member 120 is moved toward the valve 20, the O-ring 172 forms a fluid tight seal between the inner radial surface of the female coupling member 120 and the outer radial surface of the front end 28 of the valve 20. As the coupling member 120 continues to be pressed toward the valve 20, the axial projection 180 of the coupling member 120 engages the face 68 of the valve poppet member 26 causing both the poppet member 26 and the sealing plunger 126 to be moved from the closed positions to the open positions. Concurrently, the bottom portion of the clip member 140 engages the outer shoulder 76 of the valve 20 causing the clip member 140 to slide downward from the retaining position toward the connect/disconnect position. After the clip member 140 is pushed past the outer shoulder 76 of the valve 20, the clip member 140 snaps back to the retaining position such that the outer shoulder 76 is captured between the bottom shoulder 147 of the clip member 140 and the retaining ring 152. While the valve 20 and the coupling member 120 are coupled together, the poppet member 26 and the sealing plunger 126 are retained in the open positions such that there is open fluid communication between the valve 20 and the coupling member 120.

To disconnect the coupling member 120 from the valve 20, a user depresses the tab portion 142 of the clip member 140 to move the clip member 140 to the connect/disconnect position such that the bottom shoulder 147 of the plate portion 144 no longer interferes with the outer shoulder 76 of the valve 20. The valve 20 can then be axially removed from the fluid passage 124 of the coupling member 120. As the coupling member 120 is disconnected from the valve 20, the spring members 70 and 176 respectively move the poppet member 26 and the sealing plunger 126 from the open positions to the closed positions.

It will be appreciated that the term annular sealing member as used throughout the specification is not limited to an O-ring or other type of elastomeric seal. For example, the term annular sealing member includes sealing structures such as semi-rigid parts that engage each other in an interference fit to form a seal as well as other conventionally known sealing techniques.

With regard to the foregoing description, it is to be understood that changes may be made in detail, especially in matters of the construction materials employed and the shape, size, and arrangement of the parts without departing from the scope of the present invention. It is intended that the specification and depicted embodiment be considered exemplary only, with a true scope and spirit of the invention being indicated by the broad meaning of the following claims.

What is claimed is as follows:

1. A valve for dispensing a fluid to and from a container, the valve comprising:

a housing having a front end and a back end, the front end of the housing defining a poppet receiving opening and being configured for connection to a corresponding fluid coupling, the back end being adapted to connect the valve to the container, the housing defining a flow passage extending longitudinally through the housing and being configured such that fluid can be dispensed through the front end of the housing, and the housing also including a first retaining structure integral with the housing and located within the flow passage; and a poppet member telescopically mounted in the flow passage of the housing and being telescopically moveable between an open position and a closed position, the poppet member having a distal end portion and a proximal end portion, the proximal end portion including a second retaining structure that is integral with the poppet member and that cooperates with the first retaining structure to provide a snap fit connection for retaining the poppet member in the housing, and the distal end portion including a head member sized and shaped to be inserted through the front end of the housing, wherein the poppet member is arranged and configured to be loaded in the housing by inserting the poppet member through the front end of the housing.

2. The valve of claim 1, wherein the valve further comprises an annular sealing member circumferentially surrounding the head member and adapted to form a fluid tight seal with an inner radial surface of the housing when the poppet member is in the closed position.

3. The valve of claim 2, wherein the head member has a substantially flat front face that is recessed from the front end of the housing when the poppet member is in the closed position.

4. The valve of claim 1, wherein the first retaining structure comprises a retaining surface located within the flow passage of the housing, and the second retaining structure comprises a projection extending radially outward from the proximal end portion of the poppet member, wherein the projection engages the retaining surface to retain the poppet member in the housing.

5. The valve of claim 4, wherein the retaining surface and the projection each has a transverse component with respect to a longitudinal axis of the housing.

6. The valve of claim 4, wherein the projection comprises a barb structure.

7. The valve of claim 4, wherein the retaining surface is formed by a back side of a containment ring positioned in the flow passage of the housing.

8. The valve of claim 1, wherein the first retaining structure comprises a containment ring positioned in the flow passage of the housing.

9. The valve of claim 1, wherein the second retaining structure comprises a barb structure.

10. The valve of claim 8, wherein at least a portion of the proximal end of the poppet member extends through the containment ring, and the second retaining structure comprises a projection extending radially outward from the proximal end portion of the poppet member that engages a back side of the containment ring to retain the poppet member within the housing.

11. The valve of claim 10, wherein the projection comprises a barb structure.

12. The valve of claim 10, further comprising a spring mounted on the poppet member and captured between the head member and the containment ring, the spring biasing the poppet member toward the closed position.

13. The valve of claim 8, wherein the containment ring is connected to the housing by a cage structure having a plurality of legs extending axially through the flow passage in spaced relation from an inner radial surface of the housing, the legs having first ends integrally formed with the distal end portion of the housing and second ends integrally formed with the containment ring.

14. The valve of claim 1, further including a cap member mounted on the front end.

15. The valve of claim 1, wherein the housing is integrally formed as a single unitary piece.

16. The valve of claim 15, wherein the first retaining structure is integrally formed as a single unitary piece with the housing.

17. The valve of claim 1, further comprising an o-ring arranged and configured to form a radial seal between the head member and the housing.

18. The valve of claim 1, wherein the head member defines an outwardly opening circumferential slot, and a sealing member is mounted in the circumferential slot.

19. The valve of claim 1, wherein the first retaining structure includes a retaining member defining a central opening arranged and configured to receive the proximal end portion of the poppet member.

20. The valve of claim 19, wherein the retaining member is connected to the housing by a cage structure having a plurality of legs extending axially through the flow passage in spaced relation from an inner radial surface of the housing, the legs having first ends integrally formed as a single piece with the front end of the housing and second ends interconnected with the retaining member.

21. The valve of claim 20, wherein the retaining member, the cage structure, and the housing are integrally formed as a single unitary piece.

22. The valve of claim 20, wherein the axial legs are circumferentially spaced about the head member of the poppet member, and the head member slides along the axial legs as the poppet member moves between the open and closed positions.

23. A coupling assembly for dispensing a fluid to and from a container, the coupling assembly comprising:

a valve housing having a front end and a back end, the front end of the housing defining a poppet receiving opening and forming a male coupling portion, the back end being adapted to connect the valve housing to the container, the valve housing defining a flow passage extending longitudinally therethrough such that fluid can be dispensed through the front end of the housing, and the valve housing also including a first retaining structure integrally formed with the valve housing and located within the flow passage;

a poppet member telescopically mounted in the flow passage of the valve housing and being telescopically moveable between an open position and a closed position, the poppet member having a distal end portion and a proximal end portion, the distal end portion including a head member sized and shaped to be inserted through the poppet receiving opening defined by the front end of the housing, the poppet member being arranged and configured to be loaded in the housing by inserting the poppet member through the front end of the housing, and the proximal end portion including a second retaining structure that is integral with the poppet member and that cooperates with the first retaining structure to provide a snap fit connection for retaining the poppet member in the valve housing;

a first sealing member circumferentially surrounding the head member and forming a fluid tight seal with an inner radial surface of the valve housing when the poppet member is in the closed position; and a female coupling member constructed and arranged to mate with the male coupling portion of the valve housing.

24. The coupling assembly of claim 23, further comprising a second sealing member mounted within the female coupling member for forming a fluid tight seal between the female coupling member and the valve housing.

25. The coupling assembly of claim 24, further comprising a clip member mounted within a slot defined by the female coupling member and adapted for releasably connecting the female coupling member and the valve housing, the clip member being constructed and arranged to retain the second sealing member within the female coupling member.

26. The coupling assembly of claim 25, further comprising a retaining ring mounted within the female coupling member between the clip member and the second sealing member.

27. A method for assembling a valve including a housing having a front end and a back end, the back end being adapted to connect the valve to a container and the front end being adapted for connection to a fluid coupling, the housing defining a flow passage extending longitudinally through the housing and configured for allowing fluid to be dispensed through the front end of the housing, the housing also including a first retaining structure located within the flow passage; and a poppet member telescopically mounted in the flow passage of the housing and being telescopically moveable between an open position and a closed position, the poppet member having a distal end portion and a proximal end portion, the distal end portion including a head member sized and shaped for insertion through the front end of the housing and defining a maximum width of the poppet member, the proximal end portion including a second retaining structure that cooperates with the first retaining structure to provide a snap fit connection between the housing and the poppet member, the method comprising the steps of:

inserting the proximal end of the poppet member into a poppet receiving opening defined by the front end of the housing;

pushing the poppet member toward the back end of the housing thereby causing the head member to slide through the poppet receiving opening defined by the front end of the housing such that the entire poppet member is located within the housing, and also causing the second retaining structure to snap past the first retaining structure to provide a snap fit connection, wherein once second retaining structure is snapped past the first retaining structure, interference between the first and second retaining structures prevents the poppet member from disengaging from the housing.

28. The method of claim 27, wherein the housing in integrally formed as a single unitary piece.

29. A female coupling comprising:

a housing including a front end and a back end and defining a flow passage extending longitudinally therethrough, the housing also defining a slot oriented generally transversely with respect to the housing;

a clip member mounted in the housing slot, the clip member being moveable within the slot between a first position in which the clip member is adapted for retaining a male coupling member within the housing, and a second position in which the male coupling member can be inserted into or removed from the flow passage of the housing; and a sealing member mounted within the flow passage of the housing, the sealing member being retained within the housing by the clip member and being adapted for forming a fluid tight seal between the housing and the male coupling member.

30. The female coupling claim 29, further comprising a retaining ring mounted within the housing between the clip member and the sealing member.

* * * * *